Figure 1:
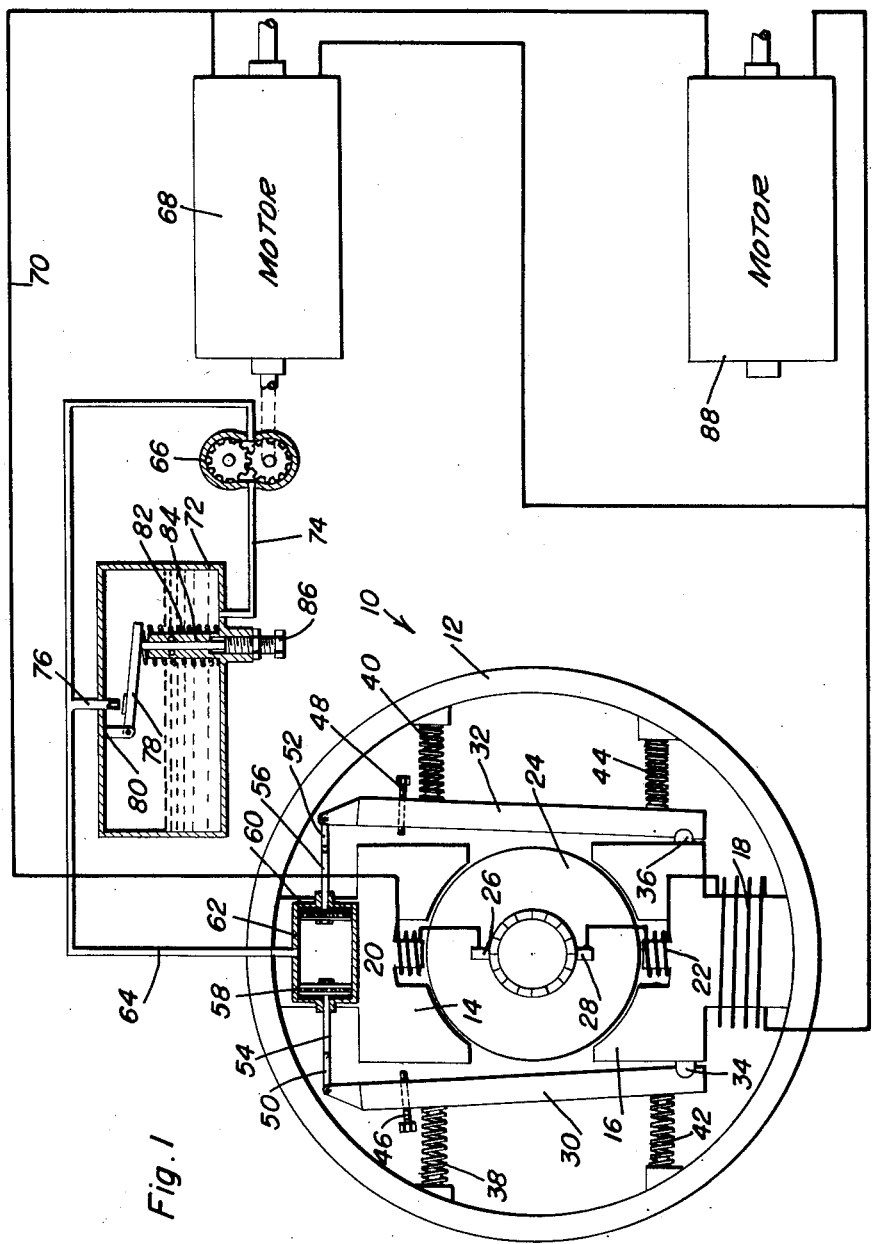

Albert Melentine
INVENTOR.

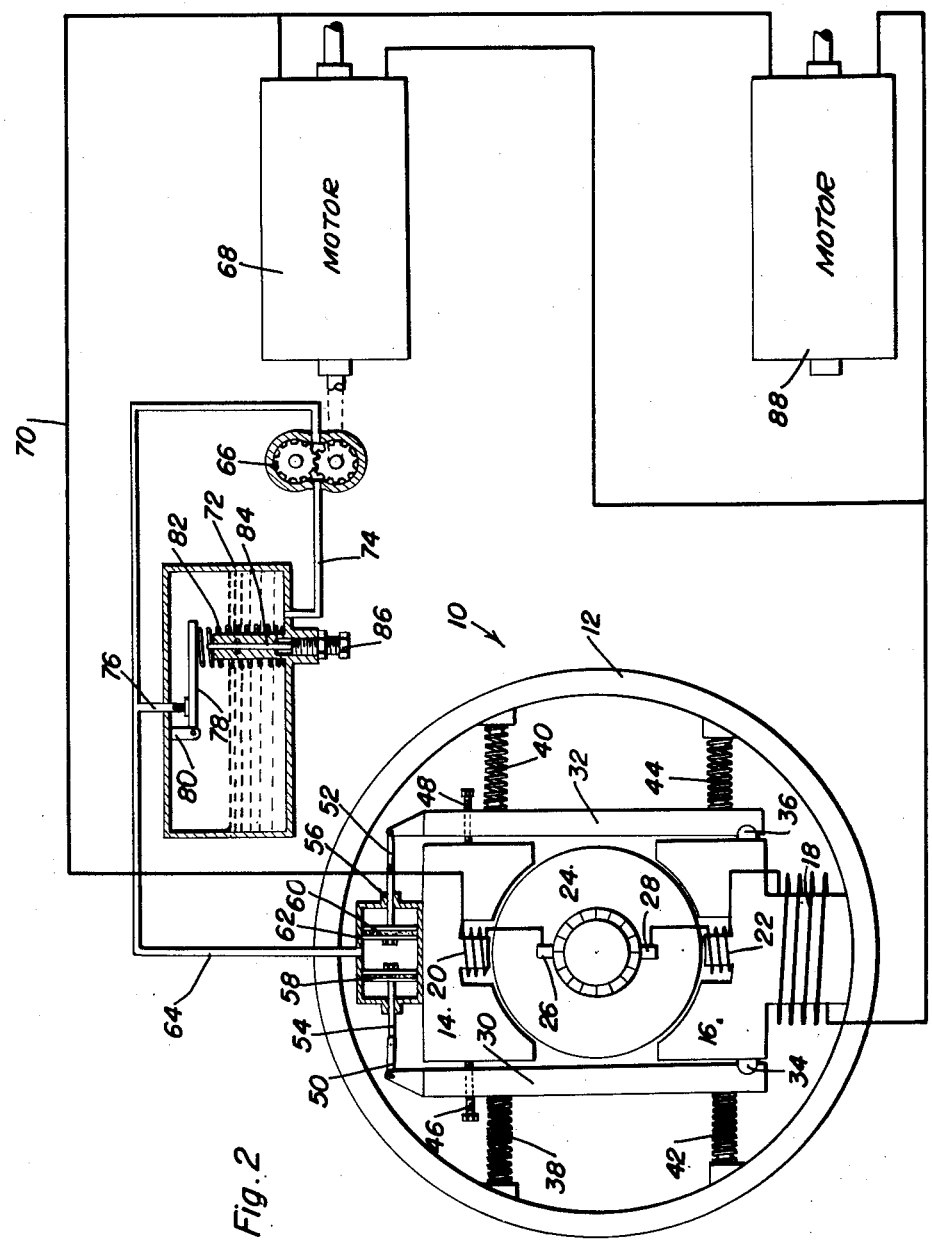

United States Patent Office 2,807,772
Patented Sept. 24, 1957

---

2,807,772

GENERATOR CONTROL BY ADJUSTABLE MAGNETIC SHUNT

Albert Melentine, Prairie du Sac, Wis.

Application August 27, 1954, Serial No. 452,675

6 Claims. (Cl. 322—50)

This invention relates to dynamoelectric machines and more particularly to a novel control for a series type generator.

The primary object of the present invention resides in the provision of a unique control providing the output of a generator which employs hydraulically actuated damping plates arranged for movement within the magnetic flux field of the generator to shunt the flux thereby varying the electromagnetic force induced in the coils of the armature of the generator.

The construction of this invention features a pair of damping plates which are pivotally mounted for movement into and out from the magnetic flux field. Hydraulic means are provided for controlling movement of the damping rods and this hydraulic means is responsive to the speed of a series motor. The hydraulic means further include a pump driven by the motor for providing fluid to a cylinder having opposed pistons therein with the piston rods thereof being connected to the damping plates. A bypass valve is provided for relief of the pressure at optimum position.

The further objects and features of this invention reside in the provision of an electric drive control that is highly efficient in operation, equally responsive, and capable of sensitive adjustment.

These, together with the various other ancillary objects and features of the invention which will become apparent as the following description proceeds, are attained by this electric drive control, the preferred embodiment of which has been illustrated in the accompanying drawings, by way of example only, wherein:

Figure 1 is a schematic view illustrating the invention with the damping plates moved outwardly to a position of reduced shunting action; and Figure 2 is a schematic illustration of the invention shown in a position with the damping plates inwardly positioned for shunting action.

With continuing reference to the accompanying drawings wherein like reference numerals designate similar parts throughout the various views, reference numeral 10 is used to generally designate a generator or similar dynamoelectric machine which includes an outer shell 12 to which pole pieces as at 14 and 16 are adapted to be attached. A pair of main windings 18, the upper winding not being visible, are provided on the pole pieces 16 and commutator windings 20 and 22 are likewise provided for the pole pieces 14 and 16. In the magnetic flux field provided by the pole pieces 14 and 16 there is rotatably mounted the armature 24 and brushes as at 26 and 28 are provided for transfer of the current induced in the armature 24 due to the rotation thereof in the magnetic flux field.

Pivotally attached for movement into and out of the flux field are a pair of damping plates 30 and 32 which are pivotally attached as at 34 and 36 respectively and which are normally urged inwardly by springs 38 and 40 and 42 and 44 which are suitably carried by brackets or the like attached to the shell 12. Inwardly secured in the damper plates 30 and 32 are set screws 46 and 48 adapted to act as stops so as to prevent the rearward movement of the damper plates 30 and 32 while also engaging the pole piece 14 to complete a positive shunt flux path.

Pivotally attached to the damper plates 30 and 32 are links 50 and 52 which are also pivotally attached to piston rods 54 and 56 connected to pistons 58 and 60 within the hydraulic cylinder 62. The cylinder 62 is mounted above the pole piece 14 and has connected thereto a fluid conduit 64 which is connected to a pump 66 driven by a series wound motor 68 connected to the commutator coil 20 through electrical conductor 70. The pump 66 is fed from a reservoir 72 through conduits 74 and connected to the conduit 64 is a bypass conduit 76 communicable with the reservoir 72. A valve member 78 is pivotally mounted on a bracket 80 within the reservoir 72 and is spring pressed by means of spring 82 so as to close the conduit 76. An adjustable stop 84 controlled by adjusting screw 86 is provided so as to limit the lowered position of the valve member 78 and to control the tension on the spring 82. The adjustment arrangement 84, 86 may be of any conventional construction as may be desired.

As can be readily understood the speed of rotation of the pump 66 and hence the amount of fluid pumped thereby is directly proportional to the speed of the motor 68. Therefore, when a suitable amount of fluid has been introduced into the cylinder 62 to move the pistons 58 and 60 to the position as is shown in Figure 1, so the fluid will cause a pressure build up in the conduit 64 which will in turn cause the fluid to press downwardly upon the valve member 78 until such fluid can pass thereby into the reservoir 72. This action will cause the damper plates 30 and 32 to move outwardly so that the generator can produce a greater quantity of electricity thus allowing the motor 68 to be run at its desired speed. Control of the motor which is relatively easy since the motor 68 is comparatively small when compared to the generator 10 to permit a highly effective control of the generator 10. Another series motor 88 or the like may be connected through suitable conductors through the output of the generator 10 for driving other auxiliaries of the driver as such is necessary.

From the foregoing, the construction and operation of the device will be readily understood and further explanation is believed to be unnecessary. However, since numerous modifications and changes will readily occur to those skilled in the art, it is not desired to limit the invention to the exact construction shown and described, and accordingly all suitable modifications and equivalents may be resorted to, falling within the scope of the appended claims.

What is claimed as new is as follows:

1. A drive control for a dynamoelectric machine having pole pieces for forming a magnetic flux field, an armature rotatable within said magnetic flux field, pivotally mounted damper plates movable into and out from said magnetic flux field to shunt the magnetic flux field to a variable extent, and hydraulic control means for actuating said damper plates.

2. A drive control for a dynamoelectric machine having pole pieces for forming a magnetic flux field, an armature rotatable within said magnetic flux field, pivotally mounted damper plates movable into and out from said magnetic flux field to shunt the magnetic flux field to a variable extent, and hydraulic control means for actuating said damper plates, said hydraulic control means comprising a cylinder having opposed pistons therein actuating piston rods connected to said damper plates, a fluid reservoir, pump means connected to said reservoir and said cylinder for supplying fluid under pressure from said reservoir to said cylinder, and pressure responsive bypass means for said fluid connecting said cylinder with said reservoir.

3. A drive control for a dynamoelectric machine having pole pieces for forming a magnetic flux field, an armature rotatable within said magnetic flux field, pivotally mounted damper plates movable into and out from said magnetic flux field to shunt the magnetic flux field to a variable extent, and hydraulic control means for actuating said damper plates, said hydraulic control means comprising a cylinder having opposed pistons therein actuating piston rods connected to said damper plates, a fluid reservoir, pump means connected to said reservoir and said cylinder for supplying fluid under pressure from said reservoir to said cylinder, and pressure responsive bypass means for said fluid connecting said cylinder with said reservoir, said pump being driven by a variable speed motor.

4. A drive control for a dynamoelectric machine having pole pieces for forming a magnetic flux field, an armature rotatable within said magnetic flux field, pivotally mounted damper plates movable into and out from said magnetic flux field to shunt the magnetic flux field to a variable extent; and hydraulic control means for actuating said damper plates, said damper plates being spring pressed inwardly to a flux damping and shunting position.

5. A drive control for a dynamoelectric machine having pole pieces for forming a magnetic flux field, an armature rotatable within said magnetic flux field, pivotally mounted damper plates movable into and out from said magnetic flux field to shunt the magnetic flux field to a variable extent, and hydraulic control means for actuating said damper plates, said damper plates being spring pressed inwardly to a flux damping and shunting position, said hydraulic control means comprising a cylinder having opposed pistons therein actuating piston rods connected to said damper plates, a fluid reservoir, pump means connected to said reservoir and said cylinder for supplying fluid under pressure from said reservoir to said cylinder, and pressure responsive bypass means for said fluid connecting said cylinder with said reservoir.

6. A drive control for a dynamoelectric machine having pole pieces for forming a magnetic flux field, an armature rotatable within said magnetic flux field, pivotally mounted damper plates movable into and out from said magnetic flux field to shunt the magnetic flux field to a variable extent, and hydraulic control means for actuating said damper plates, said damper plates being spring pressed inwardly to a flux damping and shunting position, said hydraulic control means comprising a cylinder having opposed pistons therein actuating piston rods connected to said damper plates, a fluid reservoir, pump means connected to said reservoir and said cylinder for supplying fluid under pressure from said reservoir to said cylinder, and pressure responsive bypass means for said fluid connecting said cylinder with said reservoir, said pump being driven by a variable speed motor.

References Cited in the file of this patent
UNITED STATES PATENTS

| | | |
|---|---|---|
| 1,754,039 | Pawlick et al. | Apr. 8, 1930 |
| 1,972,986 | Garden | Sept. 11, 1934 |
| 2,184,766 | Harding | Dec. 26, 1939 |